(12) United States Patent
Shackleford (10) Patent No.: US 6,477,519 B1
(45) Date of Patent: Nov. 5, 2002

(54) CELLULAR ARRAY FOR IMPLEMENTING THE SET MERGING FUNCTION

(75) Inventor: J. Barry Shackleford, Portola Valley, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/988,124

(22) Filed: Nov. 19, 2001

(51) Int. Cl.[7] ................................................. G06N 5/02
(52) U.S. Cl. ............................... 706/45; 706/13; 716/2; 716/9
(58) Field of Search .......................... 706/45, 13; 707/6; 716/9, 2

(56) References Cited

U.S. PATENT DOCUMENTS

| | | | | |
|---|---|---|---|---|
| 5,581,657 A | * | 12/1996 | Lyon | .......................... 706/13 |
| 5,682,322 A | * | 10/1997 | Boyle et al. | .................... 716/2 |
| 5,815,403 A | * | 9/1998 | Jones et al. | .................... 716/9 |
| 5,970,487 A | * | 10/1999 | Shackleford et al. | .......... 707/6 |

* cited by examiner

Primary Examiner—Wilbert L. Starks, Jr.

(57) ABSTRACT

An iterative array of identical cells to implement a crossover function in a genetic algorithm. Each function cell receives two input values and two select values that determine which input value is outputted. By creating an array of these cells, two sets of information of any size can be rapidly and accurately merged to form one set composed of elements of both sets. The cellular array uses identical, repeated cells to implement the crossover function according to precise guidelines. These guidelines are that no data is to be repeated and no data is to be lost, while retaining the order of the parent chromosomes used in crossover.

15 Claims, 7 Drawing Sheets

CELLULAR ARRAY FOR IMPLEMENTING THE SET MERGING FUNCTION

TECHNICAL FIELD OF THE INVENTION

This invention relates generally to the field of set merging, and more specifically to a method of implementing a set merging function as an array of cells for use in a genetic algorithm machine.

BACKGROUND

Although evolutionary computing has roots as far back as the 1950s, genetic algorithms (hereinafter referred to by the initials GA) were introduced in 1975 by John Holland as a method for finding an optimum or near optimum solution to complicated problems. As noted by another researcher, Grefenstette, the GA is a useful method for finding optimum or near optimum solutions to the Traveling Salesman Problem, a classic and well-known computationally intractable problem.

Figure 1:
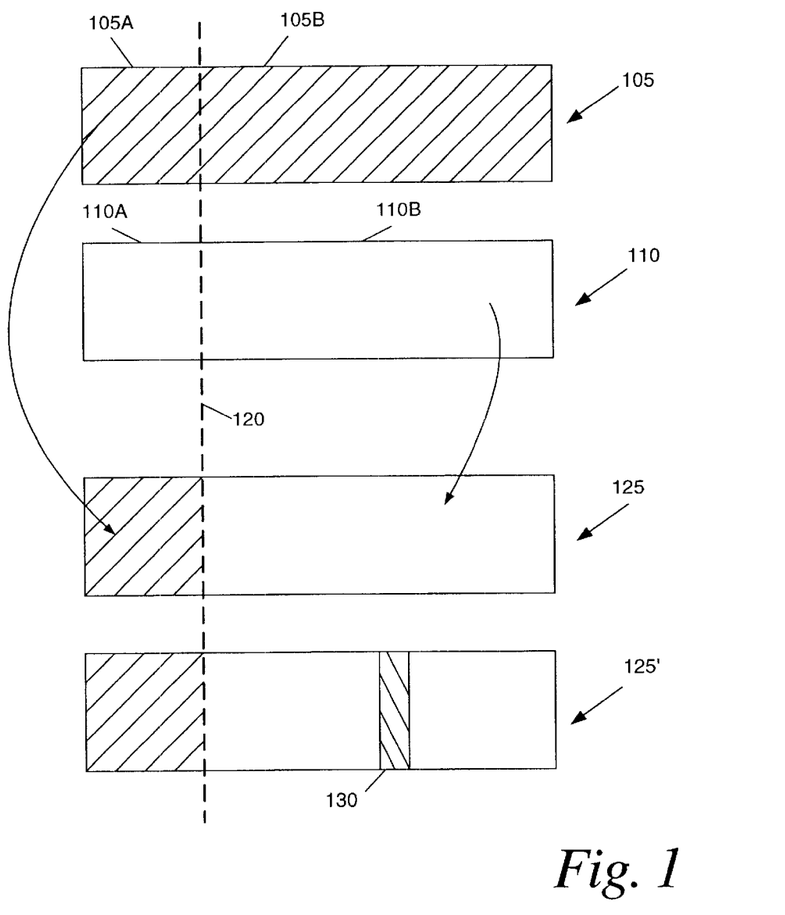
FIG. 1 depicts a conceptual diagram of evolution of a genetic algorithm.

With reference now to FIG. 1, there is illustrated therein a conceptual model of a genetic algorithm and how a solution to a problem evolves in processing the GA, generally designated by the reference numeral 100. As is understood in this art, in a genetic algorithm, an emulated chromosomal data structure is initially designed to represent a candidate or trial solution. A number of chromosomes of that data structure are then randomly generated and are registered in groups or populations of solutions. Parent chromosomes are selected from this population of generated chromosomes according to a given algorithm, e.g., selected chromosomes 105 and 110 in FIG. 1. Each generated chromosome is assigned a unique problem-specific fitness which may or may not differ from other chromosomes in the population, identifying the solution quality of the chromosome. The problem-specific fitness is expressed by a fitness value, as is known in the art. In a true evolutionary, survival of the fittest manner, particular chromosomes are selected from the population of chromosomes in proportion to their fitness values with more-fit chromosomes having a higher probability of being selected.

As further illustrated in FIG. 1, when a pair of parent chromosomes, e.g., chromosomes 105 and 110, are selected from the population, the parent chromosomes are combined using a probabilistically generated cut point, designated by the reference numeral 120. In the case of having no cutpoint generated, either of the parent chromosomes is simply copied to provide a new chromosome as a child chromosome. Thus, a child chromosome is created and outputted. The child chromosome, therefore, contains portions of each parent or the whole portion of a parent, e.g., a child chromosome 125 contains portion 105A of parent chromosome 105 and portion 110B of parent chromosome 110, as illustrated in FIG. 1. The child chromosome may then be mutated in a controlled manner, preferably having a low probability. In the evolutionary example illustrated in FIG. 1, the mutation is performed through inversion of a bit 130 in the child chromosome 125, e.g., 0 to 1 or 1 to 0. A mutated child chromosome 125' is then evaluated to be assigned its fitness value. An evaluated child chromosome along with its fitness value is then stored as a member of the next generation in the population, perhaps replacing one or both of the associated parent chromosomes 105 and 110.

After repeated iteration of this evolutionary process, the general fitness of chromosomes in the population improves toward the optimal solution. Thus, a solution to the problem emerges in the population, and is acquired with highly-fit chromosomes concentrated in the population.

In the conventional approach, a GA is emulated by software and the algorithm used for computing the fitness of a GA-based candidate solution to the combinatorial problem is also emulated by software. Due to such a software-based emulation on conventional computers, however, the execution speed of the algorithm for finding an optimum solution to the combinatorial problem is extremely slow.

Thus, a major drawback of conventional machines is the slow execution speed of a GA when emulated by software on conventional general-purpose computers.

A hardware-based implementation of a GA has been addressed for offsetting the drawback but only with a limited success in its execution speed. U.S. Pat. No. 5,970,487 to Shackleford, et al. solved some of the drawbacks and disadvantages of prior art techniques, particularly speed of operation, by the utilization of a hardware-based framework for accelerated used of genetic algorithms. The advantages and usages of the Shackleford et al. invention, Shackleford being the sole inventor in the instant application, are fully described in U.S. Pat. No. 5,970,487, which is incorporated by reference herein.

A common problem that is generally solved using a genetic algorithm is a combinatorial problem, also called a routing or ordering problem. A combinatorial problem is deemed to be a non-deterministic polynomial hard (NP-hard) problem, which is intractable to solve using brute force computations, e.g., finding solutions to such problems may take longer than the life of the universe. Indeed, such difficult problems must be solved by other paradigms, i.e., the genetic algorithm approach. A resource selection from among many resources by an applied form of a GA, minimizing the hardware architecture of a logic circuit, for example, will most efficiently solve an NP-hard combinatorial problem.

An example of a combinatorial problem is the Traveling Salesman Problem (or TSP), as is known in the art, which can be used to model many combinatorial, routing and ordering problems. The TSP seeks to find the shortest route between n cities, and while any solution which contains all n cities once and only once is valid, some solutions are better than others. A solution to the problem describes the order of travel between cities, which determines the distance of the route traveled, so the order of travel between cities having the shortest route is the best solution. It should be understood that the TSP is an NP-hard combinatorial problem with n! potential solutions and (n−1)! unique solutions.

Figure 2:
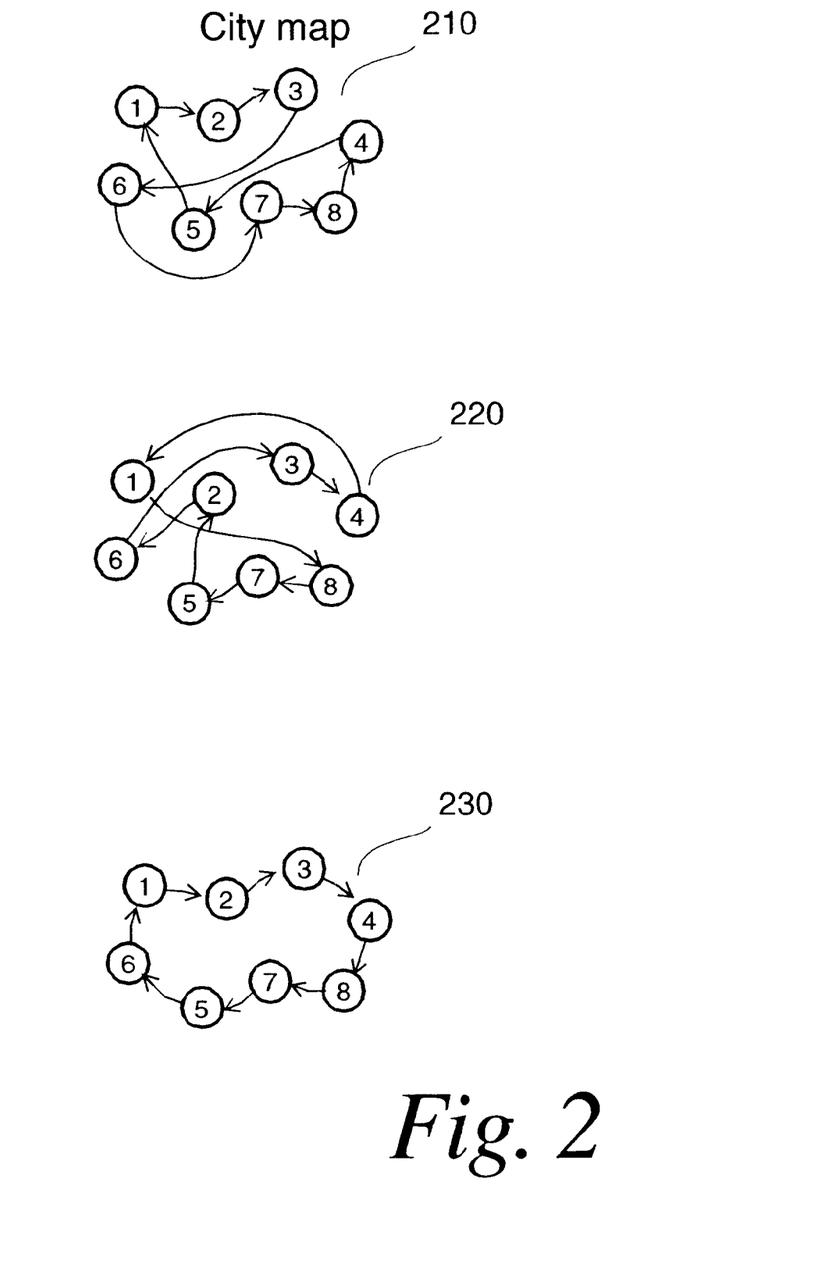
FIG. 2 depicts a series of examples of solutions for a Traveling Salesman Problem.

With reference now to FIG. 2, there is illustrated a series of examples of solutions to a Traveling Salesman Problem. In an 8-city problem, having a particular arrangement of cities, any route that includes all cities once and only once is valid. In the first solution of FIG. 2, designated by the reference numeral 210, one possible solution to the Traveling Salesman Problem is illustrated. However, it is apparent that solution 210 is not the best solution for the problem. The route depicted in solution 210 is clearly not the shortest possible route needed to cover all 8 cities. Another example, referenced by the numeral 220, depicts another possible solution to the Traveling Salesman Problem although, again, solution 220 is not the best solution. The solution illustrated by the example referenced by the numeral 230 depicts the best solution, which is readily apparent as the solution having the shortest distance and, thus, the best order.

Because of the large number of possible solutions to a Traveling Salesman Problem, e.g., a 32-city TSP has over $2.5*10^{35}$ solutions, heuristic and non-deterministic solving methods must be used to solve this type of problem. The TSP can be solved through a optimal solution-finding approach that aims at attaining an optimal solution through a screening process of candidate or trial solutions created through a GA, based upon a fitness evaluation of the candidate solutions. In this approach, more-fit candidate solutions are selected with less-fit candidate solutions screened out to concentrate highly-fit solutions or chromosomes and in the end to reach an optimal or near optimal solution.

The Shackleford et al. invention achieves significant increase in execution speed in its hardware implementation. The hardware implementation of a GA machine, such as that set forth in Shackleford et al., requires fast hardware-based implementations of the various steps of a GA machine, the parent selection step, the crossover step, the mutation step, the evaluation step, and the survival step.

However, the Shackleford et al. invention, although configured to solve a great many difficult problems in an expeditious manner, is not optimized to solve a combinatorial problem of the type modeled by the TSP. In particular, the crossover step does not optimally combine two parent chromosomes consistent with the TSP. In the implementation described in the Shackleford et al. invention, each bit of every chromosome is information, and crossover consists of creating a child chromosome C by taking information directly from one parent chromosome P1 until a cutpoint is reached, then taking information from another parent chromosome P2 until another cutpoint is reached, and so on. The Shackleford et al. invention utilizes this form of crossover, which is valid in problems such as the set covering problem and the protein folding problem, as is known in the art.

A different implementation of crossover, however, is required when every part of every chromosome is unique information. When every part of each parent chromosome is unique information, for example in the TSP, a more complicated implementation is required. Crossover in this case consists of creating a child chromosome C from the first parent chromosome P1 until a cutpoint is reached, then further creating the child chromosome C from the second parent chromosome P2 where all unique information is passed on, and no information is repeated in the child chromosome.

Figure 3:
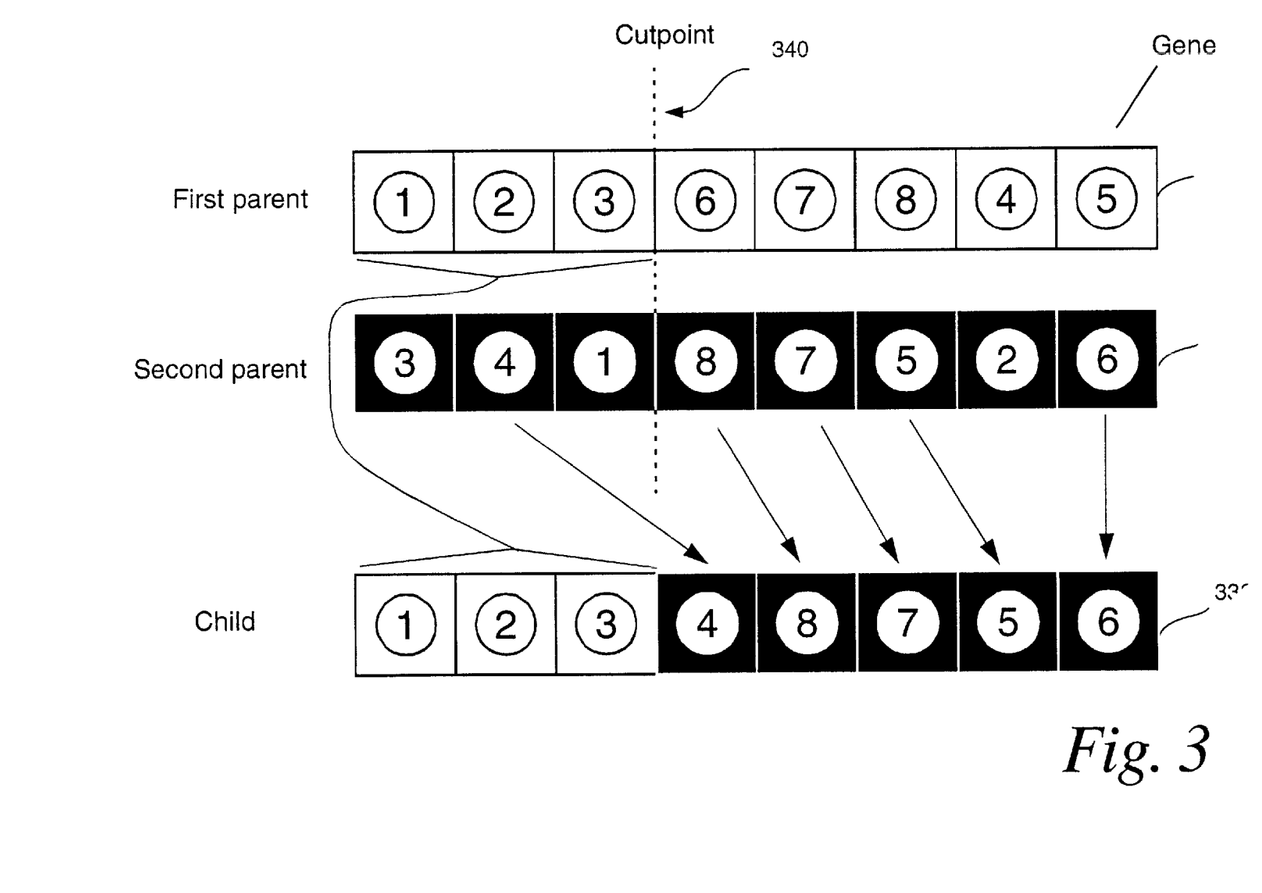
FIG. 3 depicts a crossover particular to the Traveling Salesman Problem of FIG. 2.

With reference now to FIG. 3, there is illustrated an example of crossover as described hereinabove in relation to the Traveling Salesman Problem, generally designated by the reference numeral 300. As shown in FIG. 3, information from the first parent chromosome 310 is taken without modification to create the first part of the child chromosome 330. Ordering information from the second parent chromosome 320 is taken in order left-to-right, in a manner so as to complete the child chromosome 330 with no loss or duplication of information. A cutpoint, designated by the numeral 340, is shown to divide the parent chromosomes 310 and 320 into two parts. It should be apparent from this example that the first parent chromosome 310 in this crossover is dominant to the second parent chromosome 320 in that the ordering information of the first parent chromosome 310 is retained entirely in the child chromosome 330, while some modification of the ordering information of the second parent chromosome 320 may be necessary before the information is used in the child chromosome 330. It should also be apparent that the parent chromosomes 310 and 320, as well as the child chromosome 330, correspond directly to the series of examples of Traveling Salesman Problem solutions 210, 220, and 230 depicted in FIG. 2.

With reference to the TSP as described hereinabove, then, valid solutions contain every city, and solutions containing duplications of cities or solutions missing cities are invalid. Therefore, child chromosomes created by combining two different parent chromosomes must contain one and only one value corresponding to each city.

Another illustration of this type of crossover deals with two randomly shuffled decks of cards. To create a third deck that retains ordering information of the two original decks, part of one deck can be taken and used to directly create the third deck. However, when taking a part of the second deck, it is necessary to first check the first part of the second deck for information not included in the first part of the first deck, and include it first. Then, there will be no loss of data. Also, once that information has been taken from the second deck and added to the third, information in the next part of the second deck will be added to the third deck, after it has been checked for duplications. In this way, all information is retained, including order, with no duplications, when the two decks are combined to create a third deck.

For use in a GA machine, the crossover step must be implemented quickly and accurately, combining the parent chromosomes with no loss of data and in a minimum amount of time.

There is, therefore, a present need to design a fast hardware-based implementation of a crossover function, that retains the order of the parent chromosomes with no loss or distortion of data, which is required for rapid evolution of solutions through a GA. What is needed is, accordingly, an invention that performs a crossover algorithm.

SUMMARY

The present invention is directed to an iterative array of identical cells to implement a crossover function in a genetic algorithm. Each function cell receives two input values and two select values that determine which input value is outputted. Through creation of an array of these cells, two sets of information of any size can be rapidly and accurately merged to form one set composed of elements of both sets, according to precise guidelines. These guidelines are that no data is to be repeated and no data is to be lost, while retaining the order of the parent chromosomes used in crossover. In addition to the general usefulness of speed from hardware implementation, the system and methodology are particularly useful on a genetic algorithm machine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The features, aspects, and advantages of the present invention will become better understood with regard to the following description, appended claims, and accompanying Drawings where:

DETAILED DESCRIPTION

Figure 4:
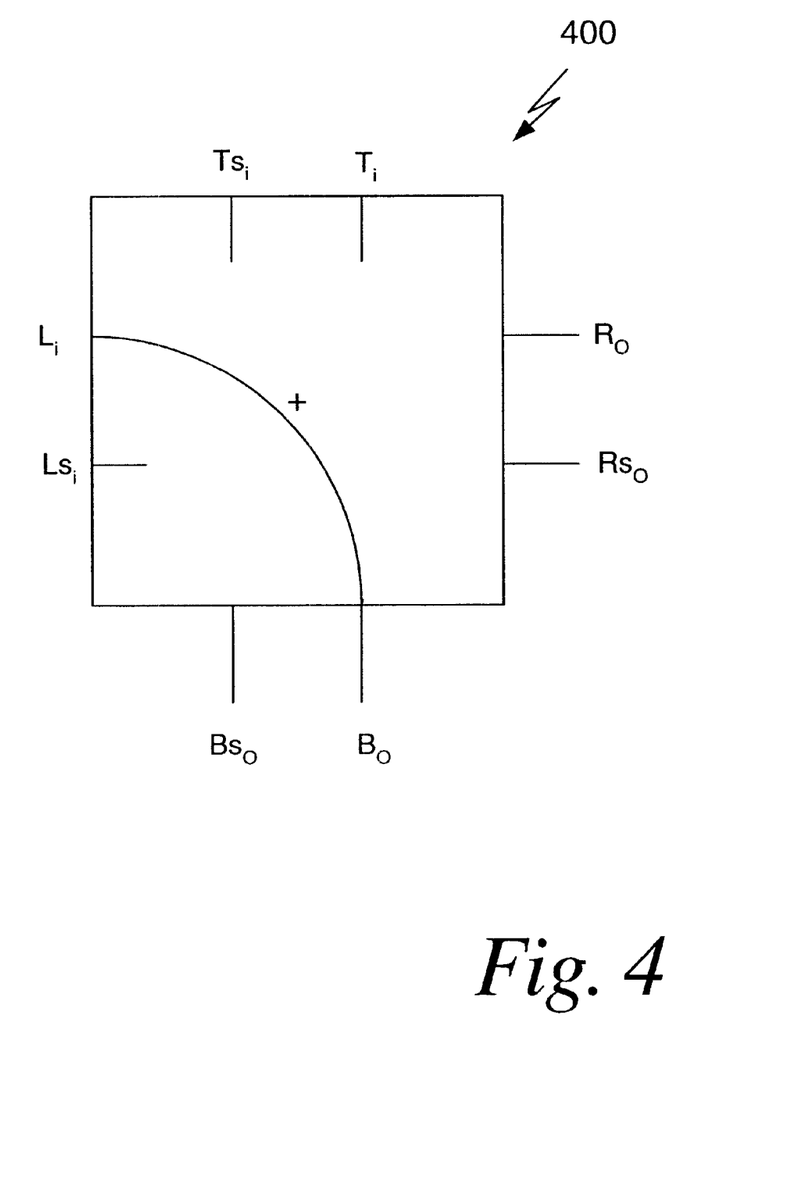
FIG. 4 depicts a block diagram of a single cell, according to the present invention.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein. With reference now to FIG. 4 of the drawings, there is illustrated therein a block diagram of a single cell of a cellular array, utilizing the principles of the present invention. Each cell, generally designated the reference numeral 400, is composed of two data inputs and two input select lines, as well as two data outputs and two output select lines. The inputs and outputs are labeled $T_i$ and $Ts_i$ for top input and top input selector, $B_o$ and $Bs_o$ for bottom output and bottom output selector, $L_i$ and $Ls_i$ for left input and left input selector, and $R_o$ and $Rs_o$ for right output and right output selector.

Figure 5:
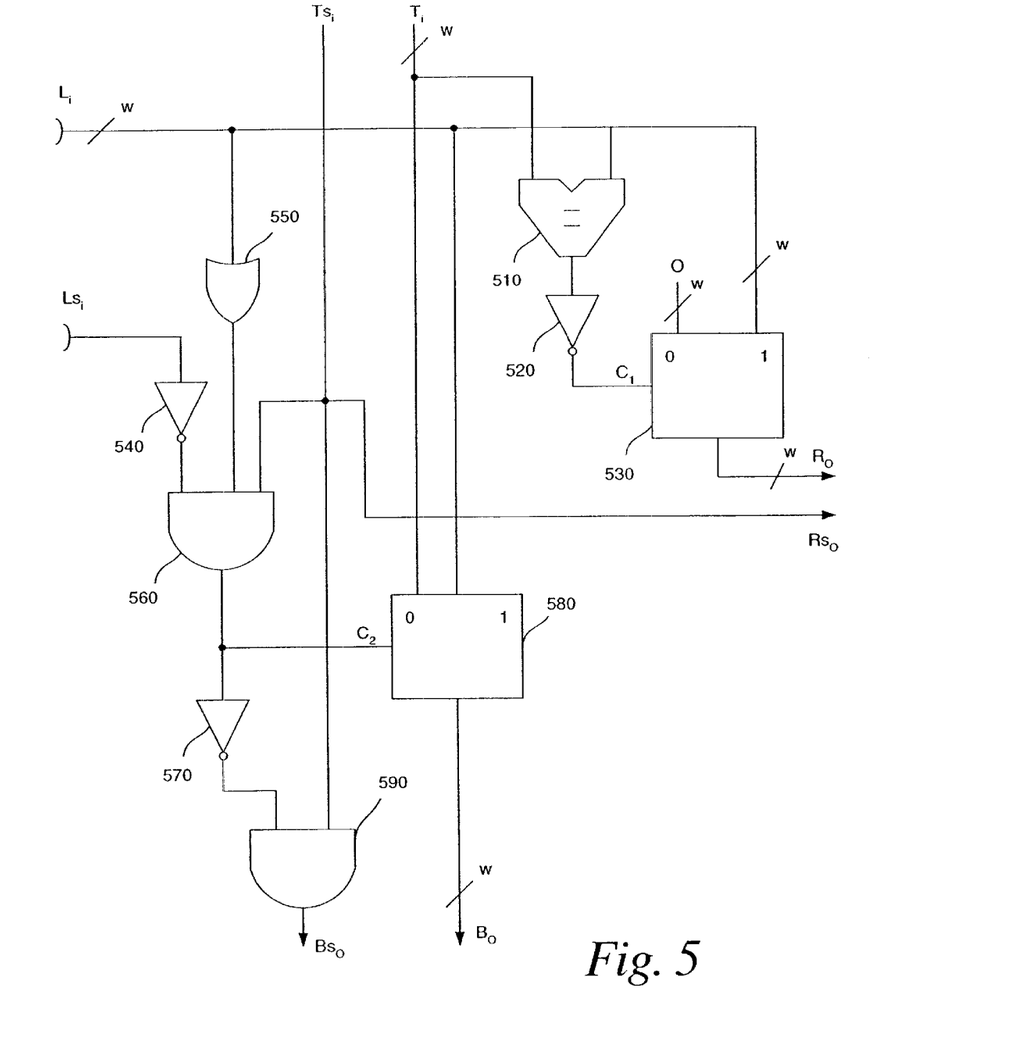
FIG. 5 depicts a circuit diagram of the single cell of FIG. 4, according to the present invention.

With reference now to FIG. 5, there is illustrated a schematic diagram of the logical operation of the single cell as described in FIG. 4. Each cell, generally designated by the reference numeral 500, contains various components. These components are a comparator 510, an inverter 520, a 2-input multiplexer 530, an inverter 540, a w-bit-width OR gate 550, a 3-input AND gate 560, an inverter 570, a 2-input multiplexer 580, and a 2-input AND gate 590. Each cell 500 also receives inputs and transmits outputs corresponding to those described in connection with cell 400 as illustrated in FIG. 4, including $T_i$ and $Ts_i$, $B_o$ and $Bs_o$, $L_i$ and $Ls_i$, and $R_o$ and $Rs_o$. Each cell receives information of any size, where the bit-width of $T_i$, $L_i$, $B_o$, and $R_o$ may be w as determined by an equation employing the ceiling function, as is known in the art, where $$w = \lceil \log_2(n-1) \rceil$$

and n is the number of elements of the solutions that form input sets of the cellular array. The bit-width of $Ts_i$, $Ls_i$, $Bs_o$, and $Rs_o$, however, is always one.

The logical operation of a single cell is explained in detail hereinbelow, as if the cell were one in an array of identical, repeating cells, as depicted hereinbelow in connection with FIG. 6.

In the cell 500, the input values of $L_i$ and $T_i$ are compared 510. If the values are equal, then zero is passed to an adjacent cell on the right through $R_o$; if the values are not equal, then $L_i$ is passed to the adjacent cell on the right through $R_o$. It should be apparent that zero is not a data value, but instead is reserved for an implicit control. More specifically, as illustrated in FIG. 5, the input values $T_i$ and $L_i$ enter the comparator 510, where the result is inverted 520 and is used as a control $C_1$ in a multiplexer 530. The multiplexer 530 receives the input values $L_i$ and zero and passes one of the input values to $R_o$, as determined by the control value $C_1$. By passing zero if the values are equal, and thereby allowing only one copy of any value to be passed, the array avoids duplication of data; and by passing $L_i$ to the adjacent cell on the right through $R_o$ if the values are not equal, then the value is not lost and is passed identically to the adjacent cell, and the array does not lose data. As further shown in FIG. 5, the select bit $Ts_i$ is passed to the adjacent cell through the select bit $Rs_o$. The select bit $Rs_o$ controls the value of $Ts_i$ in the adjacent cell.

The values of $L_i$ or $T_i$ may be passed to an adjacent cell below through $B_o$, as determined in the multiplexer 580 by the values $Ts_i$, $L_i$, and $Ls_i$. The select value $Ts_i$ directly controls which value, $L_i$ or $T_i$, may be passed to the adjacent cell below through $B_o$. When $Ts_i$ is zero, then $T_i$ is passed to $B_o$. However, when $Ts_i$ is one, then $L_i$ or $T_i$ may be passed to the cell below, as determined by $Ls_i$ and $L_i$. When $Ls_i$ is one, as when $Ts_i$ of the preceding adjacent cell to the left is one, then $T_i$ is passed down to $B_o$. Likewise, when $L_i$ is zero, when $L_i$ and $T_i$ were equal in a previous cell to the left, then $T_i$ is passed down to $B_o$. Otherwise, when $Ls_i$ is zero, produced by the value $Ts_i$ being zero in the cell adjacent to the left, or when $L_i$ is nonzero, such as when $L_i$ is a unique value that is not a duplication of any value previously analyzed by a cell, then $L_i$ is passed to the cell below through $B_o$. With reference again to FIG. 5, $Ts_i$ is sent, $Ls_i$ is inverted 540 before being sent, and $L_i$ is sent through the w-bit-width OR gate 550 before being sent into a 3-bit-width AND gate 560. The result of the AND gate 560, which is 1 if $Ls_i$ is 0, $L_i$ is nonzero, and $Ts_i$ is 1, and 0 otherwise, is sent as a control bit $C_2$ to the multiplexer 580. Also, the values of $T_i$ and $L_i$ are sent into the multiplexer 580 as the data into address 0 and 1 of the multiplexer 580, respectively. The result of the multiplexer 580 is then sent to $B_o$. For example, when $Ls_i$ is one or $L_i$ is zero or $Ts_i$ is zero, then $T_i$ is sent to $B_o$. However, when $Ls_i$ is zero and $L_i$ is nonzero and $Ts_i$ is one, then $L_i$ is sent to $B_o$. It should be apparent to those skilled in the art that $T_i$ is passed on to $B_o$ more frequently than $L_i$.

The output select value of $Bs_o$ is determined by the values of $Ts_i$, $Ls_i$, and $L_i$. The value $Ts_i$ is a select bit that indicates both which input value to pass down through $Bs_o$, as described hereinabove, but also directly controls $Bs_o$. For example, if $Ts_i$ is zero, then $Bs_o$ is zero. It should be apparent that when $Ts_i$ is zero, then $Bs_o$ is zero and, as described hereinabove, $T_i$ is passed down to the cell below through $B_o$. However, if $Ts_i$ is one, then $Bs_o$ is determined by $Ls_i$ and $L_i$. The value of $Ls_i$ is controlled directly by the value of $Ts_i$ in the preceding adjacent cell to the left. When $Ts_i$ is zero in the adjacent cell to the left but one in the cell itself, then $Bs_o$ is zero. Only when $Ts_i$ is one in both cells consecutively, both the preceding adjacent cell to the left and the cell itself, is $Bs_o$ also one. The value of $L_i$, whether zero or nonzero, also determines the value of $Bs_o$. When $L_i$ is zero, as described hereinabove, then $L_i$ in a previous adjacent cell to the left is a value equal to $T_i$ and invalid. When $L_i$ is zero, then, the value of $Bs_o$ is set to one in order to insure that a valid value for $L_i$ is passed on through $B_o$, as described hereinabove. If $Ls_i$ is zero and $L_i$ is nonzero, then $Bs_o$ is zero; but if $Ls_i$ is one, or if $L_i$ is zero, then $Bs_o$ is one. Logically, as illustrated in FIG. 5, $Ts_i$, an inverted 540 $Ls_i$, and $L_i$ are sent through the w-bit-width OR gate 550 before being sent into the 3-bit-width AND gate 560. The result of the AND gate 560, which is 1 if $Ls_i$ is 0, $L_i$ is nonzero, and $Ts_i$ is 1, and 0 otherwise, is inverted 570 and sent to a 2-bit-width AND gate 590, along with $Ts_i$. The result of the AND gate 590 is sent to $Bs_o$. It should be apparent that $Bs_o$ is most directly related to the value of $Ts_i$, while $Bs_o$ receives input from $Ls_i$ and $L_i$ only when $Ts_i$ is not sufficient to determine the value of $Bs_o$.

Alternatively, a truth table which illustrates the function of the single cell as described in connection with FIG. 5 hereinabove is depicted hereinbelow. The values of the selects $Ts_i$ and $Ls_i$, as well as $Bs_o$ and $Rs_o$, are either zero or one, while the values of $T_i$ and $L_i$ are data. $L_i$ may be set data or null data, while $T_i$ may contain set data equal to the set data of $L_i$, or set data unequal to the set data of $L_i$. Each case is included in the truth table:

| $L_i$ | $T_i$ | $Ls_i$ | $Ts_i$ | $R_o$ | $B_o$ | $Rs_o$ | $Bs_o$ |
|---|---|---|---|---|---|---|---|
| $L_i$ | $T_i \ne L_i$ | 0 | 0 | $L_i$ | $T_i$ | 0 | 0 |
| $L_i$ | $T_i \ne L_i$ | 0 | 1 | $L_i$ | $L_i$ | 1 | 0 |
| $L_i$ | $T_i \ne L_i$ | 1 | 0 | $L_i$ | $T_i$ | 0 | 0 |
| $L_i$ | $T_i \ne L_i$ | 1 | 1 | $L_i$ | $T_i$ | 1 | 1 |
| $L_i$ | $T_i = L_i$ | 0 | 0 | null | $T_i$ | 0 | 0 |
| $L_i$ | $T_i = L_i$ | 0 | 1 | null | $L_i$ | 1 | 0 |
| $L_i$ | $T_i = L_i$ | 1 | 0 | null | $T_i$ | 0 | 0 |
| $L_i$ | $T_i = L_i$ | 1 | 1 | null | $T_i$ | 1 | 1 |
| null | $T_i$ | 0 | 0 | null | $T_i$ | 0 | 0 |
| null | $T_i$ | 0 | 1 | null | $T_i$ | 1 | 1 |
| null | $T_i$ | 1 | 0 | null | $T_i$ | 0 | 0 |
| null | $T_i$ | 1 | 1 | null | $T_i$ | 1 | 1 |

Figure 6:
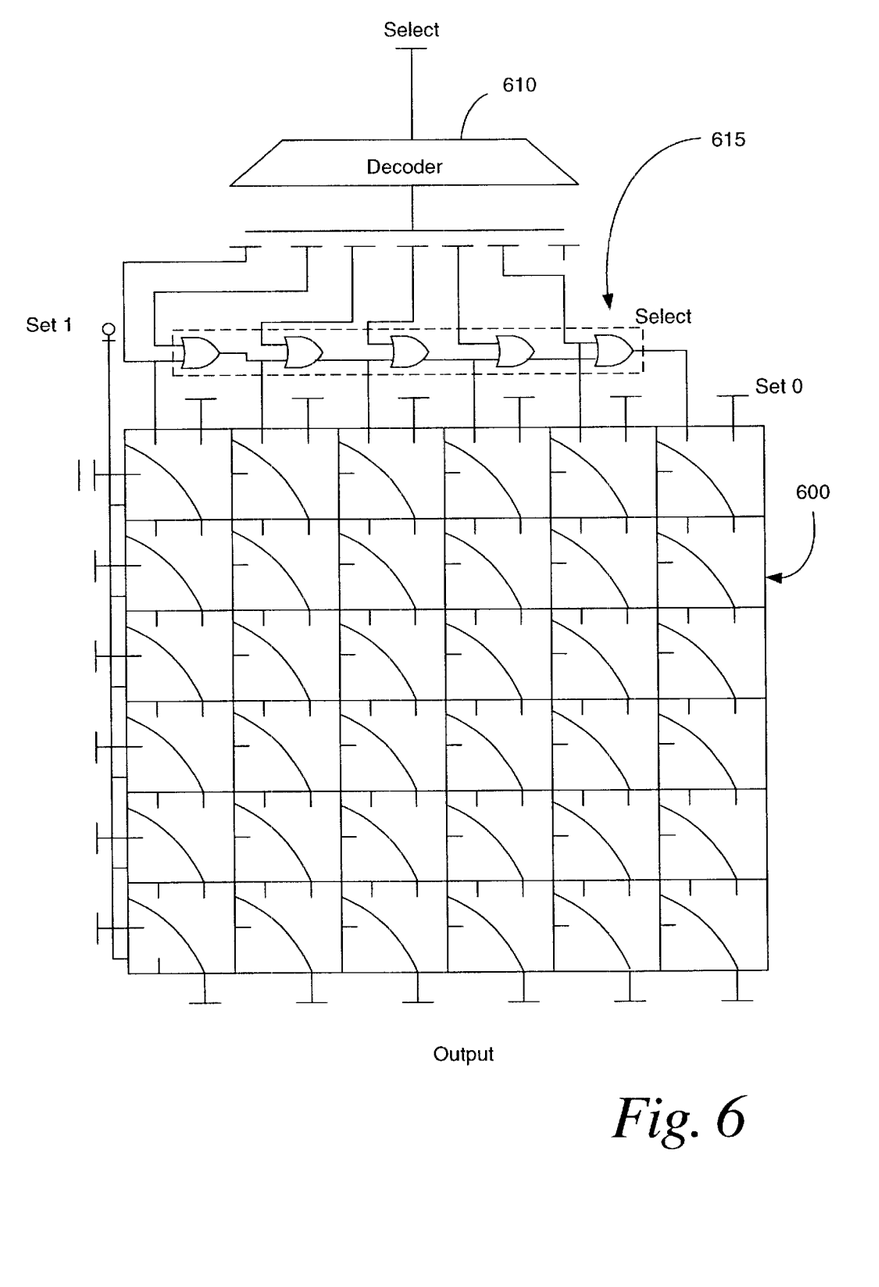
FIG. 6 depicts a sample configuration of a cellular array, with cells of FIGS. 4 and 5, according to the present invention.

With reference now to FIG. 6, there is illustrated a block diagram that shows a sample configuration of cells, the logical operation of respective ones of which is described hereinabove with reference to FIG. 5, to form a cellular array, generally designated by the reference numeral 600, according to the present invention. Also included in the diagram is a select decoder 610, an array of OR gates 615, and inputs Set 0 and Set 1, as set forth in the figure.

The cellular array combines Set 0 and Set 1 to conform to precise guidelines. These guidelines are that each solution generated by combining Set 0 and Set 1 must contain all the data contained in each individual set, with no duplication or loss of data. Data includes not only each value contained in each set but also the order of the values of the sets. The operation of the cellular array is complex in order to meet the guidelines. Each cell in the array depends directly and only upon those cells above and to the left, as described in detail above with reference to FIGS. 4 and 5.

With reference again to FIG. 6, a select is passed through the select decoder 610, where the select is divided into individual bits. The select may be of size w, according to the size of the inputs. Once the select is passed through the select decoder 610, the individual bits are passed through an array of OR gates, collectively designated by the reference numeral 615, and transmitted as input into the cellular array. The array of OR gates 615 normalizes the values passed into the cellular array so that each input select value is passed either as a zero or a one. More specifically, the array of OR gates 615 serves to condition the select signal $Ts_i$ to the cellular array by setting all select signals to 1 to the right of the active signal from the decoder 610.

As illustrated in FIG. 6, the input values $T_i$ and $L_i$ of each cell in the initial row of the array, as described in FIG. 5, receive input from Set 0 and Set 1, respectively. Each cell input $Ts_i$ of the initial row of the array receives input from the decoder that translates the incoming select set as described hereinabove. Each cell input $Ls_i$ of the initial row of the array is initially set to 0.

In the rows of the array, each value of Set 1 is passed horizontally across the array. As each value is passed, it is compared with the value in the cell above it. If the two values are equal, and if the value of Set 0 is a value already present in the row above, then zero is passed across the array instead, as described hereinabove with reference to FIG. 5. This indicates that the row contains no new information, and guarantees that there is no duplication of data.

In the columns of the array, each value of Set 0 is passed vertically down the array, column by column, from the cell input value $T_i$ to the cell output value $B_o$, as described in FIG. 5. However, the value of Set 1 in the form of the cell input value $L_i$ is sometimes passed down, depending on the select bits $Ts_i$ and $Ls_i$ of each cell. When the cell select bit $Ts_i$ is zero, such as when the select bit is zero before the cutpoint is reached in crossover and all information comes from Set 0, then the cell input value $T_i$ is passed down the column, cell by cell, to the output of the array. When the cell select bit $Ts_i$ is one, such as when the select bit is one after the cutpoint is reached and all information comes from Set 1, then the next value from Set 1 will be passed down to the cell below. In order to choose Set 1, the array will pick the first value from the left that is non-zero, in order to avoid duplication of data. After passing a value from Set 1 down, the cell select bit $Ts_i$ is changed to zero, to indicate that the value should be passed down to the output of the array. The cell select bit $Ts_i$ serves as an indicator to choose between Set 0 and Set 1, and, when zero, sends that value down the array to the output.

As can be seen in FIG. 6, each cell receives input from the top and the left and, according to the select input from the top and the left, outputs either Set 0 or Set 1. In this fashion, information from Set 0 and Set 1 is combined, and, as the information outputted is determined by the select lines, there is no duplication or loss of data.

Figure 7:
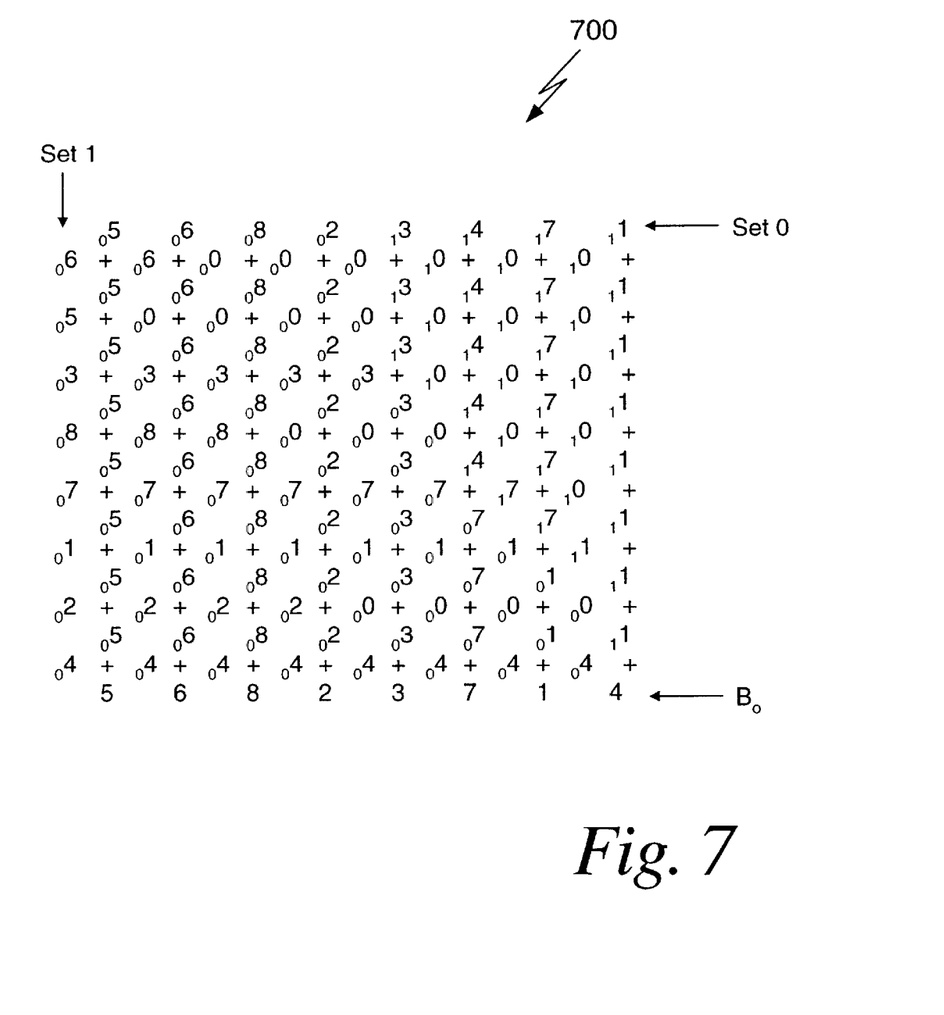
FIG. 7 depicts an illustrative table showing the set merging algorithm used bit-by-bit.

With reference now to FIG. 7, there is illustrated a table of values, generally designated by the reference numeral 700, that demonstrates the operation of the cellular array. The table includes each value inputted and outputted from each cell. In this case, Set 0 is {5, 6, 8, 2, 3, 4, 7, 1}, Set 1 is {6, 5, 3, 8, 7, 1, 2, 4} and select is {0, 0, 0, 0, 1, 1, 1, 1}. In the table, the large numbers are inputs or outputs and the small numbers are select bits. The values of Set 1 are passed horizontally across the rows of the array, except when the value is equal to the value in the cell above. When the two values are equal, then zero is passed horizontally across the rows of the array. The values of Set 0 are carried to the output of the array when the select bit is zero. When the select bit is one, and when the input value to the left is nonzero, then that input value to the left is carried to the output of the array. In this way, no data is lost, and no data is repeated.

With further reference to FIG. 7, each operation of the cellular array 600 as described in reference to FIG. 6 and the resultant table of values 700 is illustrated in detail.

In the first four columns, the input select bits $Ts_i$ are zero. Each incoming input value $T_i$, as described in reference to FIG. 6, is passed cell by cell down the columns, from the cell input value $T_i$ to the cell output value $B_o$, to the outputs of each cell $B_o$. The first four values of the output set are identical to the first four values of the input Set 0. In the second four input columns, the input select bits $Ts_i$ are one. The value of the select bits $Ts_i$ are changed, though, as the input values are passed down the columns into the next rows. In the second and third rows of the cellular array 600, the four select bits $Ts_i$ remain one. It should be understood that the values of the select bits $Ts_i$ are unchanged because $L_i$, in the second row passed first as value 6 and then as value 1, and in the third row passed first as value 5 then as value 0 when the values of $L_i$ are compared with the above values of $T_i$, is a value 0. In the fourth row, $L_i$ is passed as value 3 into the fourth column, rather than value 0, so the value of the select bit $Ts_i$ of the fourth column of the fourth row is changed to 0. The progression of the value 0 in the select bits $Ts_i$ across each row can be seen in each successive row. In the fifth row, like the fourth, there are three select bits $Ts_i$ of value 1, but the sixth row has only two select bits $Ts_i$ of value 1. The seventh row has only one select bit $Ts_i$ of value 1, which continues throughout the remainder of the cellular array 600.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A merging circuit for use in a crossover step of a genetic algorithm machine, said merging circuit merging at least two parent chromosomes to form a child chromosome, said child chromosome having a plurality of respective elements thereof each selected from at least one of said parent chromosomes, said merging circuit comprising:

an array of cells in a square configuration of rows and columns, the number of cells in each row and column corresponding to the number of elements in said parent and child chromosomes; and a control select connected to said array, said array, upon receipt of said control select, selecting said plurality of respective elements between said at least two parent chromosomes to form said child chromosome, each of said plurality of respective elements selected by said array being different.

2. The merging circuit according to claim 1, wherein in said array each cell of said array receives initial values relative to the respective elements of a first and a second parent chromosome, said initial values relative to the respective elements of said first parent chromosome being received in said rows of said array, and said initial values relative to the respective elements of said second parent chromosome being received in said columns of said array;

each said cell of said array selects between said initial values relative to the respective elements of said first and said second parent chromosomes pursuant to said control select; and each said cell of said array transmits the selected values relative to the respective elements of said first parent chromosome and said second parent chromosome, said selected values relative to the respective elements of said first parent chromosome being transmitted to respective adjacent rows of said array, and said selected values relative to the respective elements of said second parent chromosome being transmitted to respective adjacent columns of said array.

3. The merging circuit according to claim 2, wherein in said merging circuit said control select is divided into a first and a second part, said first part of said control select selecting respective elements of said first parent chromosome, said second part of said control select selecting respective elements of said second parent chromosome; and said child chromosome is formed from said respective elements of said first parent chromosome and said respective elements of said second parent chromosome pursuant to said control select, wherein said respective elements from said first parent chromosome and from said second parent chromosome are selected pursuant both to said first and to said second part of said control select and to said initial values from said respective elements of said first parent chromosome and from said second parent chromosome.

4. The merging circuit according to claim 3, wherein each respective element of said second parent chromosome is compared to each respective element of said first parent chromosome, and when the two respective elements of said first and second parent chromosomes are equal, then the respective element of said first parent chromosome is used to form the respective elements of said child chromosome.

5. The merging circuit according to claim 2, wherein said control select indicates only respective elements from said first parent chromosome, said respective elements of said first parent chromosome forming said child chromosome pursuant to said control select.

6. The merging circuit according to claim 1, wherein said genetic algorithm machine solves a non-deterministic polynomial problem.

7. The merging circuit according to claim 6, wherein said non-deterministic polynomial problem is selected from the group consisting of:

combinatorial, routing, and ordering problems.

8. The merging circuit according to claim 6, wherein said non-deterministic polynomial problem is a Traveling Salesman Problem.

9. A method for use in a crossover step of a genetic algorithm machine, said method merging at least two parent chromosomes to form a child chromosome, said child chromosome having a plurality of respective elements thereof each selected from at least one of said parent chromosomes, said method comprising steps of:

receiving a plurality of respective elements from said at least two parent chromosomes and a control select, said at least two parent chromosomes and said control select having the same number of respective elements;

selecting the respective elements of said at least two parent chromosomes to transmit pursuant to said control select;

forming said child chromosome from the respective elements of said at least two parent chromosomes, each of the respective elements of said child chromosome being different, and said respective elements of said child chromosome having an order pursuant to the order of respective elements of at least one parent chromosome; and transmitting said respective elements of said child chromosome.

10. The method according to claim 9, wherein said step of selecting further comprises the steps of:

passing values from the respective elements of a first of said at least two parent chromosomes according to a first part of said control select, wherein said control select is divided into two parts; and passing values from the respective elements of a second of said at least two parent chromosomes according to the second part of said control select, wherein said values from the respective elements of the first parent chromosome and from the respective elements of the second parent chromosome are selected pursuant both to said first and to said second part of said control select and to said values from the respective elements of said first and second parent chromosomes.

11. The method according to claim 10, wherein in said step of selecting, each value from the respective elements of said second parent chromosome is compared to each value from the respective elements of said first parent chromosome, and when the two values from the respective elements of the parent chromosomes are equal, then the value from the respective elements of said first parent chromosome is passed.

12. The method according to claim 9, wherein said step of selecting further comprises passing values from respective elements of a first of said at least two parent chromosomes according to said control select, wherein said control select indicates only said values from respective elements of said first of said at least two parent chromosomes.

13. The method according to claim 9, wherein said genetic algorithm machine solves a non-deterministic polynomial problem.

14. The method according to claim 13, wherein said non-deterministic polynomial problem is selected from the group consisting of:

combinatorial, routing, and ordering problems.

15. The method according to claim 13, wherein said non-deterministic polynomial problem is a Traveling Salesman Problem.

* * * * *